United States Patent
Colignon

(10) Patent No.: US 7,765,791 B2
(45) Date of Patent: Aug. 3, 2010

(54) SYSTEM FOR EVALUATING DEGREE OF SOOT LOADING IN DEPOLLUTION MEANS

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 863 days.

(21) Appl. No.: 11/571,259

(22) PCT Filed: Jun. 21, 2005

(86) PCT No.: PCT/FR2005/050473
§ 371 (c)(1),
(2), (4) Date: Dec. 22, 2006

(87) PCT Pub. No.: WO2006/005873
PCT Pub. Date: Jan. 19, 2006

(65) Prior Publication Data
US 2007/0245721 A1    Oct. 25, 2007

(30) Foreign Application Priority Data
Jun. 23, 2004    (FR) .................................. 04 06864

(51) Int. Cl.
*F01N 3/00* (2006.01)
(52) U.S. Cl. .............................. 60/277; 60/285; 60/299; 60/276
(58) Field of Classification Search .................. 60/276, 60/284–286, 290–291, 294–295
See application file for complete search history.

(56) References Cited

U.S. PATENT DOCUMENTS

| 7,147,693 B2 * | 12/2006 | Inoue et al. .................... 95/273 |
| 2002/0112472 A1 | 8/2002 | Tashiro et al. |

FOREIGN PATENT DOCUMENTS

| EP | 1234959 A | 8/2002 |
| EP | 1281843 A | 2/2003 |
| FR | 2801635 A | 6/2001 |
| FR | 2829798 A | 3/2003 |

* cited by examiner

Primary Examiner—Thomas E Denion
Assistant Examiner—Jesse Bogue
(74) Attorney, Agent, or Firm—Nicolas E. Seckel

(57) ABSTRACT

The inventive system comprises means (10) for determining the vehicle running mode, means (11) for determining the mass of elementary carbon exhausted by the engine according said running mode, means (15) for accumulating said elementary masses during the engine operation and obtaining a total mass thereof, means (18) for calculating the volume of ash from engine lubrication oil, means (20) for calculating the volume of ash from engine feed fuel, means (21) for calculating the effective volume of the depollution means on the basis of the total volume of the means thereof as they are new or cleaned, the already calculated volume of ash and means for calculating the degree of soot loading of the depollution means on the basis of the total mass, the effective volume and the maximum density of deposits on the depollution means.

12 Claims, 2 Drawing Sheets

SYSTEM FOR EVALUATING DEGREE OF SOOT LOADING IN DEPOLLUTION MEANS

BACKGROUND ART

The present invention concerns a system for evaluating the soot loading state of depollution means integrated in an exhaust line of a motor vehicle engine.

Such an engine can be associated with common rail means for the supply of fuel into the cylinders thereof, according to at least one post-injection.

Such a post-injection is, in a standard manner, an injection of fuel after the high dead center of the cylinder under consideration.

These supply means are adapted to implement, in isocouple, through modification of parameters for controlling the operation of the engine, different regeneration strategies making it possible to obtain different thermal levels in the exhaust line.

Thus, for example, supply means implementing regeneration strategies called normal, level 1, level 2, and/or over-calibrated level 2 strategies, have already been proposed.

Indeed, it is known that, to ensure the regeneration of depollution means such as a particle filter, the soot trapped therein are burned thanks to the thermal energy provided by the engine and to the exotherm obtained by the conversion of the HC and of the CO on means forming oxidation catalyst, placed, for example, upstream of the particle filter.

This combustion can be assisted by a catalyzing element mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

One of the main problems in connection with the use of a particle filter is its regeneration. Indeed, in the course of the use of a vehicle equipped with a particle filter, this filter clogs up. The different residues which pile up therein can have mainly four different origins. Indeed, the residues can be formed by metallic elements coming from the engine or from the exhaust line or by particles which were not filtered at the intake. Other residues can be formed by ashes coming from the lubricant of the engine or by ashes coming from the fuel supplying this engine. Finally, other residues can be formed by combustion residues of a regeneration assistance additive. Indeed, it is known that such additives can be used and can be mixed with the fuel for the supply of the engine to lower the combustion temperature of the soot trapped in the particle filter.

In a particle filter design using a regeneration assistance additive making it possible to promote the combustion of the soot, these four elements accumulate in the filter. In the case where such an additive is not used, for example, in the case of impregnated or catalyzed particle filters, only three of these elements are present in the filter, which reduces the volume of residues accumulated for a given mileage traveled.

However, whatever the design used, the particle filter clogs up progressively, thus reducing the volume available for the storage of the particles. As a result, to preserve the good thermo-mechanical resistance of the filter, it is necessary to regenerate this filter more and more often, which translates into an increase of the over-consumption of fuel in connection with the particle filter in the case, for example, where the regeneration is performed by using post-injections or a burner and by a dilution of the lubrication oil of the engine by the post-injected fuel with a risk of engine breakage.

Further, the reduction of the useful soot storing volume generates higher and higher head losses at the boundaries of the filter, which translates both into an increase of the fuel consumption of the vehicle outside of the regeneration phases and into a risk of engine break-up, for example, if the differential pressure at the boundaries of the filter is too high and provokes a reopening of the valves.

It is thus necessary to regenerate the filter after a certain mileage traveled when the volume available for the storage of the particles becomes too low.

Two vehicles having driven the same number of kilometers can have accumulated amounts of residues very different from each other, as a function of the type of driving of these vehicles. For example, city driving with an average fuel consumption of 10 liters for 100 kilometers generates 67% additive consumption residues more than open road driving with an average consumption of 6 liters for 100 kilometers. It is then appropriate to optimize the frequency of regeneration of the particle filter by evaluating as best as possible the loading state of this type of depollution means.

SUMMARY OF THE INVENTION

The objective of the invention is thus to resolve these problems.

To this effect, an object of the invention is a system for evaluating the soot loading state of depollution means integrated in an exhaust line of a motor vehicle engine, characterized in that it comprises means for determining the type of driving of the vehicle, means for determining, as a function of this determined type of driving, of a mass of elementary carbon emitted by the engine, means for combining these elementary masses during the operation of the engine to obtain a total mass, means for calculating the volume of ashes from the lubrication oil of the engine, means for calculating the volume of ashes from the fuel for the supply of the engine, means for calculating the useful volume of the depollution means from a total volume of these means when they are new or cleaned and from the volumes of ashes calculated previously, and means for calculating the loading state of the depollution means from the total mass, the useful volume and the maximal density of the deposits on the depollution means.

According to other characteristics, this evaluation system comprises further:

means for correcting the determined elementary mass, as a function of the temperature of the cooling liquid of the engine and of the atmospheric pressure;

means for calculating the volume of combustion residues of an additive mixed with the supply fuel of the engine connected to the means for calculating the useful volume;

means for comparing the calculated loading state to low, average low, and average high load threshold values, to deliver low, average low, average high, or high depollution means loading state information;

means for measuring the temperature upstream of the depollution means and means for comparing this temperature to a threshold value of spontaneous regeneration of the depollution means, to detect a spontaneous regeneration of the depollution means if the temperature upstream of the filter goes above this threshold value during a predetermined time period;

the depollution means comprise a particle filter;

the particle filter is catalyzed;

the depollution means comprise a NOx trap;

the depollution means are impregnated with an SCR formulation, ensuring a CO/HC oxidation function;

the fuel comprises an additive intended to be deposited, with the particle with which it is mixed, on the depollution means to facilitate their regeneration;

the fuel comprises an additive forming NOx trap; and the engine is associated with a turbo-compressor.

BRIEF DESCRIPTION OF THE DRAWINGS

The invention will be better understood by reading the following description given by way of example only and made in reference to the annexed drawings in which.

DETAILED DESCRIPTION OF PARTICULAR EMBODIMENTS

Figure 1:
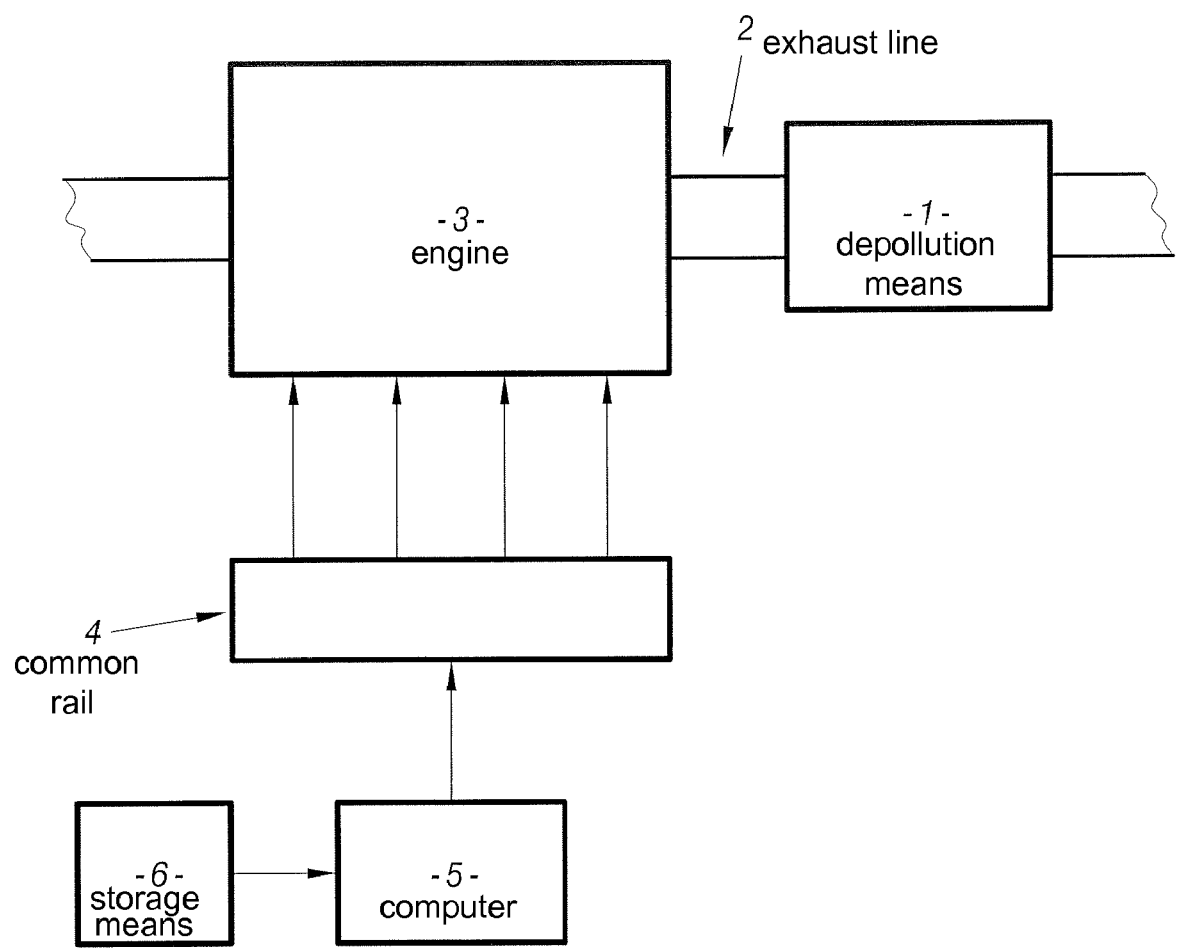
FIG. 1 is a synoptic schematic view illustrating the implantation of depollution means in an exhaust line of a motor vehicle engine.

Indeed, FIG. 1 shows depollution means designated by the general reference 1, comprising, for example, a particle filter, integrated in an exhaust line 2 of an engine 3, for example, a diesel engine, of a motor vehicle.

This engine is associated, for example, with common rail means for the supply of fuel designated by the general reference 4, whose operation is driven by a computer designated by the general reference 5, adapted to implement different driving strategies memorized in storing means designated by the general reference 6 and associated with this computer 5.

The objective of the system according to the invention is to estimate in the most precise manner possible, at any time, the soot loading state of the depollution means.

To this effect, it is appropriate to evaluate this loading state and to determine whether the mass of carbon present in this filter is sufficient, for example, to ensure a total regeneration of the filter, or whether it is too high and creates then risks of damage for the depollution means, or even for the resistance of the engine.

The principle of the evaluation system according to the invention consists in calculating the mass of elementary carbon emitted by the engine, for the current driving conditions of the vehicle, to combine these elementary masses, i.e., to integrate in time the emissions of the engine at the source, to calculate the useful volume of the filter by integrating the clogging up thereof by the various residues in particular coming from the additive, then to calculate the loading state of the filter, information which will then be taken into account by modules for triggering a regeneration of the filter, for example.

Indicators for the after-sales service by the manufacturer can also be calculated.

Figure 2:
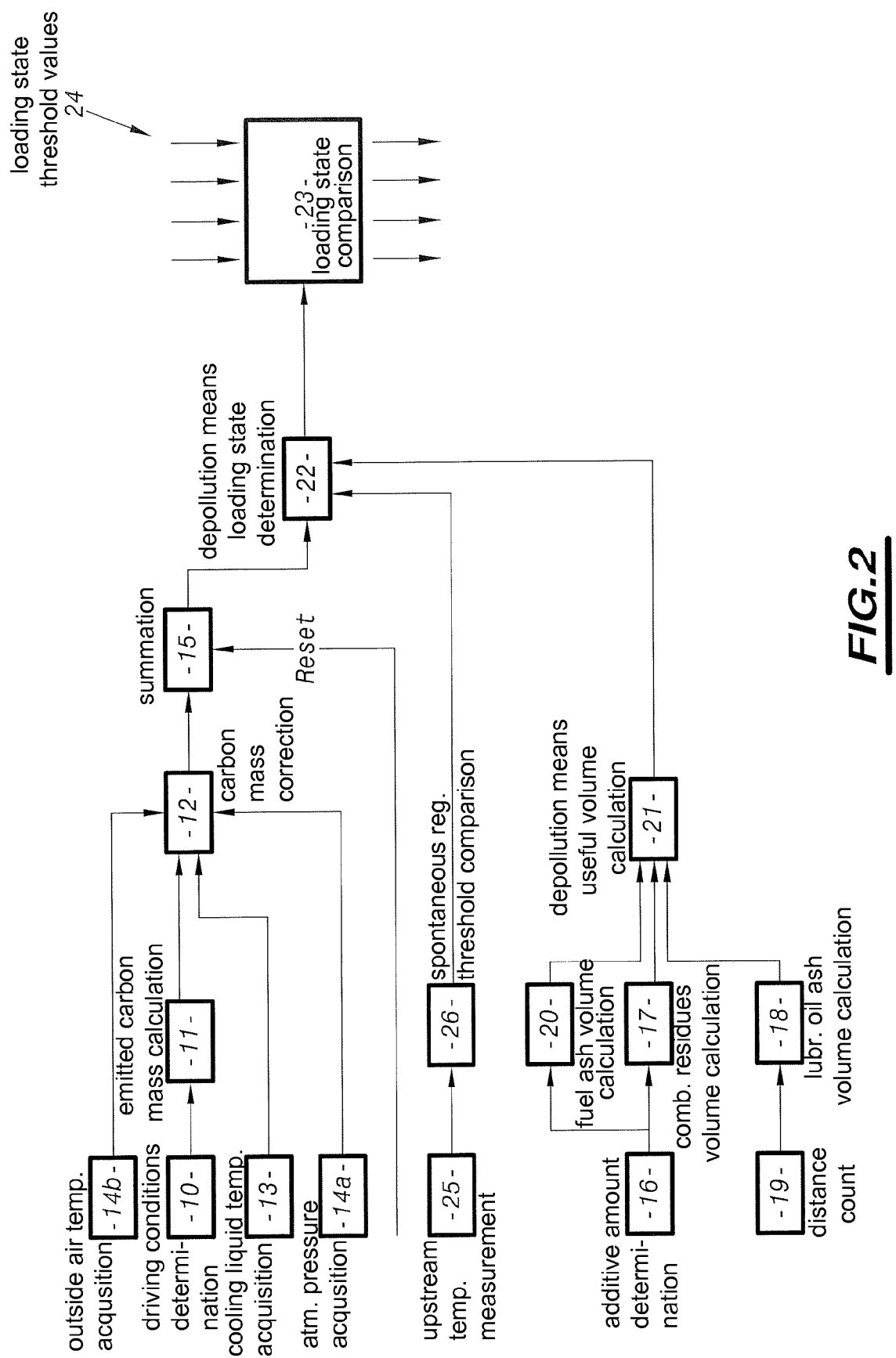
FIG. 2 is a synoptic schematic view illustrating the structure and the operation of an evaluation system according to the invention.

FIG. 2 illustrates this evaluation.

In fact, in the system according to the invention, the computer 5 performs this evaluation and it comprises then means for determining the type of driving conditions of the vehicle. These means are designated by the general reference 10 on this FIG. 2. For each type of driving conditions identified (i), a mass of elementary carbon is associated, coming, for example, from a predetermined table of elementary emissions.

Thus, to each type of driving conditions identified corresponds a mass of elementary carbon emitted on average over the calculation period of the type of driving conditions, as this is calculated by the means designated by the general reference 11 on this Figure.

Subsequently, this elementary mass is corrected by correction means designated by the general reference 12, as a function of the temperature of the cooling liquid of the engine of the vehicle such as acquired by means 13, of the atmospheric pressure $P_{atmo}$ such as provided by acquisition means 14a, and of the outside air temperature such as provided by acquisition means 14b.

The elementary mass is thus corrected according to the following equation:

$$\text{corrected elementary mass } (i) = \text{water temperature correction} * \text{altimetric correction} * \text{outside air temperature correction} * \text{elementary mass}$$

The correction can then be provided in the form of a curve as a function of the temperature of the cooling liquid, of a curve as a function of the outside air temperature, and of a curve as a function of the atmospheric pressure.

The evaluation of the corrections can be performed over predetermined reference cycles. The objective of this correction is to obtain a realistic order of magnitude for the increase of the emissions when the temperature and pressure conditions vary.

In the conditions where the user operates his or her vehicle systematically outside of normal conditions, the load indicator must indeed remain relatively objective with a tolerance, for example, in the order of 10% of the actual running mass.

Subsequently, these elementary masses are cumulated. Indeed, after each period $t_{sec}$, a new mass of elementary carbon is integrated according to the equation:

$$\text{total mass } (t) = \sum_n \text{elementary mass } (n)$$

This sum is performed via means designated by the general reference 15 on FIG. 2.

The volume of combustion residues of an additive mixed with the fuel for the supply of the engine, if such an additive is used, the volume of ashes from the lubrication oil of the engine, and the volume of ashes from a supply fuel of the engine, are also calculated.

To this effect, the amount of ashes coming from the lubricant and from the fuel, whatever the design of the particle filter, i.e., for example, a catalyzed particle filter, an impregnated particle filter, an uncoated particle filter without additive, or a particle filter with additive, but also the amount of combustion residues of the additive, which is zero for a catalyzed or impregnated particle filter or an uncoated particle filter without additive, are estimated. The amount of metallic residues coming from the engine and from the exhaust line and of particles not filtered at the intake can be considered as negligible, as has been confirmed by analysis of several samples of residues.

The amount of ashes from the lubricant accumulated in the filter depends on the lubrication oil consumption of the engine and on the ash content of the lubricant used. To simplify the calculation, the hypothesis is made that the driver of the vehicle uses, over the whole life of the vehicle, the oil recommended by the manufacturer, i.e., with a constant ash ratio. The estimation of the mass of ashes from the oil can then be made in different ways. Thus, a predetermined oil consumption value of the vehicle can be used, value which depends on the engine/vehicle under consideration.

A model of the integrator type taking into account an instantaneous oil consumption as a function of the operation conditions of the engine, and typically as a function of the engine speed and torque, can also be used.

Other, more complex models, taking into account the composition of the oil, i.e., for example, its content in phosphorus, calcium, potassium, etc., the quality of the oil or an indicator of oil maintenance, can also be envisioned to estimate the amount of ashes accumulated in the particle filter.

In the case where an oil of the typical composition is used, the mass of ashes is calculated as a function of the nature of the components coming from the combustion of the oil, for example, the phosphorus is found in the filter in the form of $PO_4$, the zinc in the form of $ZnO$ and the calcium in the form of $CaSO_4$, etc.

The mass of ashes coming from the fuel accumulated in the filter depends directly on the fuel consumption of the vehicle and on the ash content of this fuel. To simplify the calculation, the hypothesis is made that the ash content from the fuel is constant whichever the fuel supply source. The simplest calculation of the ash content from the fuel consists in using an integrator that multiplies the instantaneous consumption by the ash content from the fuel and by the time step for calculating the instantaneous consumption.

In the case where an additive is used, the mass of residues coming from this additive accumulated in the filter depends on the amount of additive that has been injected into the fuel tank. There are also several possibilities for estimating this mass. For example, the information of the amount of additive injected coming from the management computer of the dosage system of the additive can be used, but the cumulated fuel consumption since the beginning of the vehicle can also be used by multiplying it by the nominal dosage value of the additive.

The table below gives the different definitions of the symbols which are used in the following equations:

| Designation | Description | Unit |
| --- | --- | --- |
| $V_o$ | Total volume of the PF new | L |
| Conso. oil | Kilometric oil consumption of the engine | l/km |
| $\rho_{res}$ | Density of the residues coming from the additive and from the lubricant | g/l |
| Opening ratio | Proportion of the open frontal surface for the filtration of particles and the storage of residues | — |
| $K_{additive}$ | Ratio mass of residues from additive/mass of additive used (dosage) | — |
| $\rho_{oil}$ | Density of the oil | g/l |
| $K_{fuel}$ | Ratio mass of ashes from the fuel/mass of additive used | — |
| Ash content | Ratio of residues coming from the combustion of the lubricant | % |
| Distance PF new | Distance traveled since the state PF new or cleaned | Km |
| Total amount additive | Mass of additive injected since the state PF new or cleaned | |
| Free volume | Minimal free volume to store particles | l |

Regarding the additive, in the system according to the invention, means 16 can be provided for making it possible to determine the total amount of additive injected and means 17 for calculating the volume of combustion residues of this additive according to the equation:

$$\text{Volume of residues } (t) = \text{Total amount additive } (t) *$$

$$K_{additive}/\text{Opening ratio} * \rho_{res}$$

In the system according to the invention, means 18 are also provided for calculating the volume of ashes from the lubrication oil of the engine according to the equation:

$$\text{Volume oil ashes} = \text{Conso. Oil} * \rho_{oil} * \text{Distance PF new} *$$

$$\text{Ash content}/(100 * \text{opening ratio} * \rho_{res})$$

The variable Distance PF new corresponds to the distance traveled by the vehicle since the state PF new or cleaned and is determined by counting means 19.

In the system according to the invention, there means are also provided for calculating the volume of ashes from the supply fuel of the engine, these means being designated by the general reference 20, and also implementing for this calculation the total amount of additive used, according to the equation:

$$\text{Volume fuel ashes } (t) = \text{Total amount additive } (t) *$$

$$K_{fuel} \, (\text{Opening ratio} * \rho_{res})$$

All these items of information are then used by means for calculating the useful volume of the depollution means from the total volume of these means in the new or cleaned state and the volumes of ashes and of residues calculated previously.

These means are designated by the general reference 21 on this FIG. 2 and they calculate the useful volume from the equation:

$$\text{Useful volume } (t) = V_o - \text{Volume of residues } (t) -$$

$$\text{Volume oil ashes} - \text{Volume fuel ashes}$$

These different items of information can also be used as is otherwise known, to calculate after-sales indicators making it possible, for example, to request that a customer perform a maintenance operation of the particle filter, when the useful volume reaches a predetermined minimal limit value.

Subsequently, the items of information regarding the total mass and the useful volume, as calculated previously, are used by means for determining the loading state of the depollution means, designated by the general reference 22 on this FIG. 2, to calculate this loading state by using the following equation:

$$\text{Loading state \% } (t) = \text{Total mass } (t)/\text{Useful volume } (t) *$$

$$\text{Max. density}$$

In the case of regeneration difficulties, it is possible that, following an accumulation of failed regenerations, the load of the filter goes above 100%.

In this formula, Max. density represents the maximal density of the deposits on the depollution means.

This loading state is then supplied to means 23 for comparing the loading state calculated to low, average low, and average high loading threshold values, such as those designated by the general reference 24 on this FIG. 2, to supply information on low, average low, average high, or high loading state of the depollution means.

It must also be noted that the evaluation system according to the invention can comprise means for measuring the temperature upstream of the depollution means, such as those designated by the general reference 25 on this Figure, and for comparing this temperature with a threshold value of spontaneous regeneration of the depollution means, in comparison means 26, so as to detect a spontaneous regeneration of the depollution means and to supply a corresponding information to the means for evaluating the loading state 22 if the temperature upstream of the filter goes above this threshold value during a predetermined time period.

Similarly, a re-initialization (RESET) can also be triggered in the after-sales services of the manufacturer in the case of cleanup or replacement of the particle filter.

Of course, other embodiments can be envisioned. In particular, different embodiments of the depollution means can be provided.

Thus, for example, the depollution means and the means forming oxidation catalyst can be integrated into a single and same element, in particular on a same substrate.

By way of example, a particle filter integrating the oxidation function can be envisioned.

These depollution means can also be impregnated with an SCR formulation, ensuring a CO/HC oxidation function in a standard manner.

Similarly, a NOx trap integrating such an oxidation function can also be envisioned, whether it is additivized or not.

This oxidation and/or NOx trap function can also be fulfilled, for example, by an additive mixed with the fuel.

In this case, the fuel can indeed comprise an additive intended to be deposited, with the particles with which it is mixed, on the depollution means to facilitate their regeneration.

Similarly, the engine can be associated or not with a turbo-compressor.

The invention claimed is:

1. System for evaluating the soot loading state of depollution means integrated in an exhaust line of a motor vehicle engine which comprises:
    means for determining the type of driving of the vehicle,
    means for determining, as a function of this determined type of driving, of a mass of elementary carbon emitted by the engine,
    means for combining these elementary masses during the operation of the engine to obtain a total mass,
    means for calculating the volume of ashes from the lubrication oil of the engine,
    means for calculating the volume of ashes from the fuel for the supply of the engine,
    means for calculating the useful volume of the depollution means from a total volume of these means when they are new or cleaned and from the volumes of ashes calculated previously, and
    means for calculating the loading state of the depollution means from the total mass, the useful volume and the maximal density of the deposits on the depollution means.

2. Evaluation system according to claim 1, which further comprises means for correcting the determined elementary mass, as a function of the temperature of the cooling liquid of the engine and of the atmospheric pressure.

3. Evaluation system according to claim 1, which further comprises means for calculating the volume of combustion residues of an additive mixed with the supply fuel of the engine connected to the means for calculating the useful volume.

4. Evaluation system according to claim 1, which further comprises means for comparing the calculated loading state to low, average low, and average high load threshold values, to deliver low, average low, average high, or high depollution means loading state information.

5. Evaluation system according to claim 1, which further comprises means for measuring the temperature upstream of the depollution means and means for comparing this temperature to a threshold value of spontaneous regeneration of the depollution means, to detect a spontaneous regeneration of the depollution means if the temperature upstream of the filter goes above this threshold value during a predetermined time period.

6. Evaluation system according to claim 1, wherein the depollution means comprise a particle filter.

7. Evaluation system according to claim 1, wherein the particle filter is catalyzed.

8. Evaluation system according to claim 1, wherein the depollution means comprise a NOx trap.

9. Evaluation system according to claim 1, wherein the fuel comprises an additive intended to be deposited, with the particles with which it is mixed, on the depollution means to facilitate their regeneration.

10. Evaluation system according to claim 1, wherein the fuel comprises an additive forming NOx trap.

11. Evaluation system according to claim 1, wherein the depollution means are impregnated with an SCR formulation, ensuring a CO/HC oxidation function.

12. Evaluation system according to claim 1, wherein the engine is associated with a turbo-compressor.

* * * * *